United States Patent
Bosch

(10) Patent No.: US 9,257,722 B2
(45) Date of Patent: Feb. 9, 2016

(54) ACCUMULATOR AND METHOD FOR THE PRODUCTION OF AN ACCUMULATOR

(75) Inventor: Oliver Bosch, Garbsen (DE)

(73) Assignee: Johnson Controls Autobatterie GmbH & Co. KGAA (DE)

( * ) Notice: Subject to any disclaimer, the term of this patent is extended or adjusted under 35 U.S.C. 154(b) by 731 days.

(21) Appl. No.: 12/596,277

(22) PCT Filed: Apr. 15, 2008

(86) PCT No.: PCT/DE2008/000639
§ 371 (c)(1),
(2), (4) Date: Feb. 23, 2010

(87) PCT Pub. No.: WO2008/128517
PCT Pub. Date: Oct. 30, 2008

(65) Prior Publication Data
US 2010/0151316 A1    Jun. 17, 2010

(30) Foreign Application Priority Data
Apr. 18, 2007  (DE) .......................... 10 2007 018 609

(51) Int. Cl.
| | |
|---|---|
| *H01M 10/14* | (2006.01) |
| *H01M 10/16* | (2006.01) |
| *H01M 10/12* | (2006.01) |
| *H01M 2/10* | (2006.01) |

(52) U.S. Cl.
CPC .......... *H01M 10/128* (2013.01); *H01M 2/1072* (2013.01); *H01M 10/16* (2013.01); *Y02E 60/126* (2013.01); *Y02P 70/54* (2015.11); *Y10T 29/49108* (2015.01); *Y10T 29/49114* (2015.01)

(58) Field of Classification Search
CPC .... H01M 10/128; H01M 10/14; H01M 10/16
USPC .......................................................... 429/161
See application file for complete search history.

(56) References Cited

U.S. PATENT DOCUMENTS

| | | | |
|---|---|---|---|
| 5,607,797 A | 3/1997 | Hasegawa et al. | |
| 2001/0041288 A1 * | 11/2001 | Onishi et al. ................. | 429/161 |

FOREIGN PATENT DOCUMENTS

| | | | |
|---|---|---|---|
| DE | 20 2006 001 509 | | 4/2006 |
| DE | 202006001509 | * | 4/2006 |
| DE | 202009001509 | * | 4/2006 |
| EP | 1 515 379 | | 3/2005 |
| EP | 1 830 429 | | 9/2007 |
| JP | 58172874 | * | 10/1983 |
| JP | 61-7573 | | 1/1986 |
| JP | 62 064050 | | 3/1987 |
| JP | 7-161374 | | 6/1995 |
| JP | 10144341 | * | 5/1998 |
| JP | 200193576 | * | 4/2001 |
| JP | 2003-178723 | * | 6/2003 |

* cited by examiner

*Primary Examiner* — Ula C Ruddock
*Assistant Examiner* — Thomas Parsons
(74) *Attorney, Agent, or Firm* — Boardman & Clark LLP

(57) ABSTRACT

The invention relates to an accumulator (10), particularly a prismatic lead accumulator, comprising a housing and (a) at least one stack (29) of plates, (b) which has a plurality of spaced-apart pole plates (14, 16) that are entirely suspended by a fixing element (28) in at least one circumferential direction (U). According to the invention, the fixing element (28) is fixedly connected to the housing (19).

15 Claims, 2 Drawing Sheets

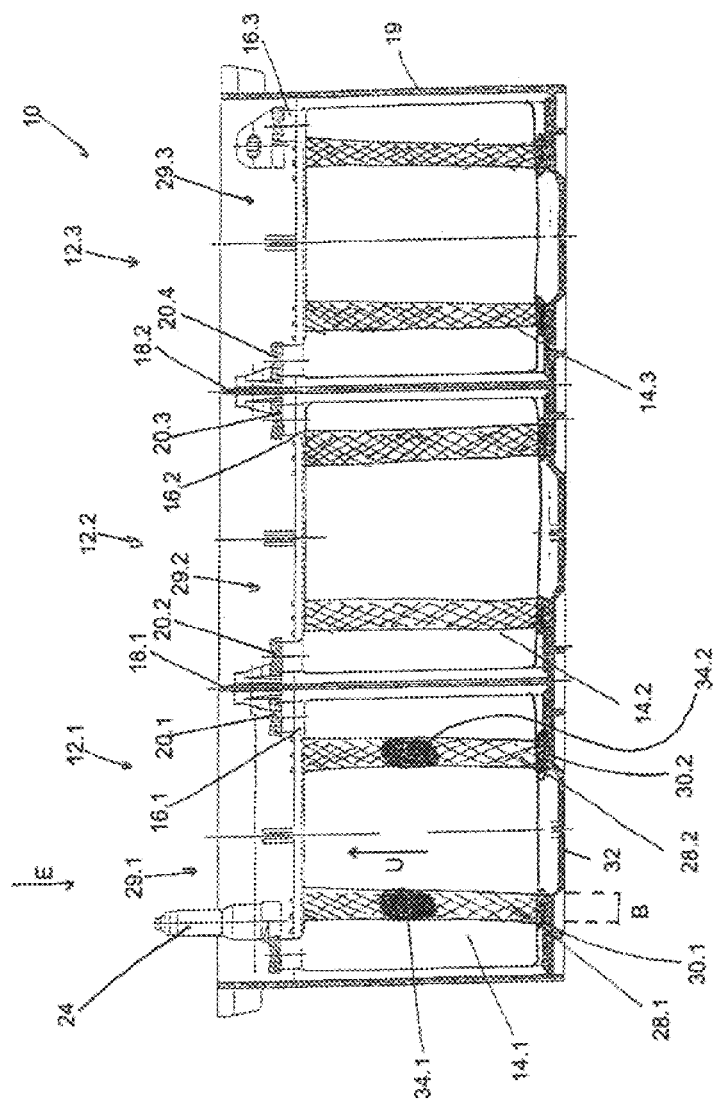

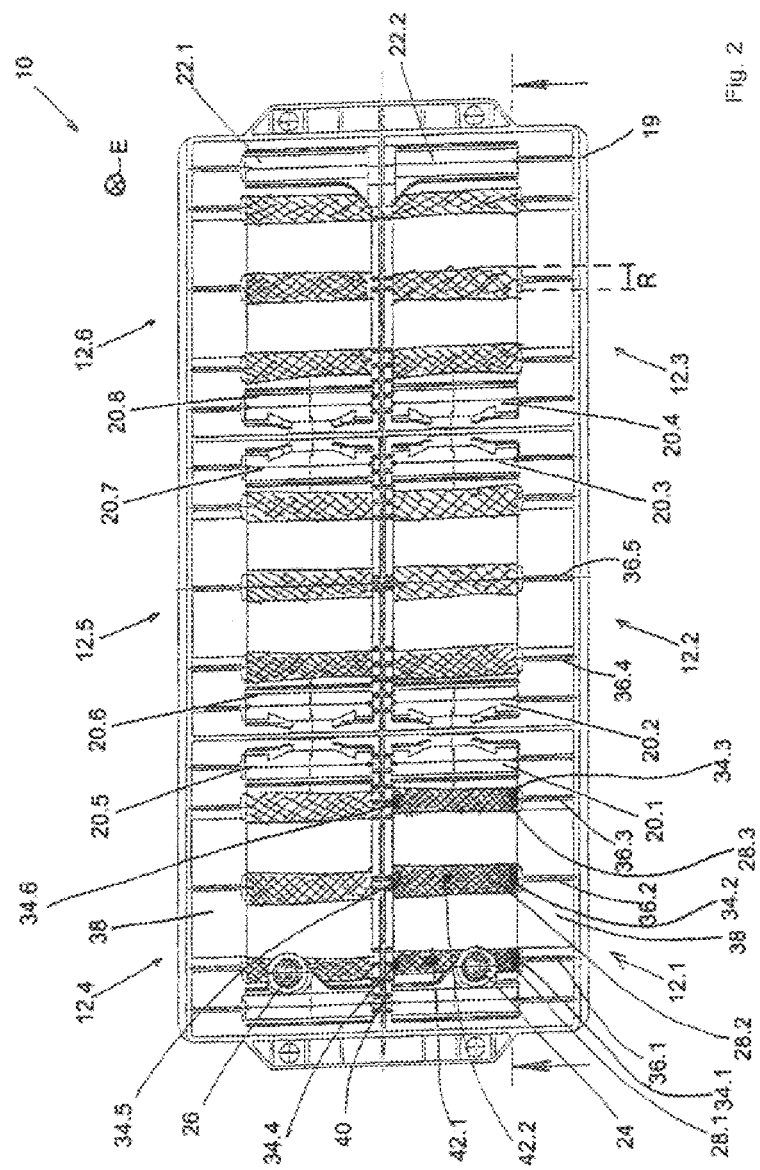

ACCUMULATOR AND METHOD FOR THE PRODUCTION OF AN ACCUMULATOR

FIELD OF THE INVENTION

The invention relates to an accumulator, in particular a lead-acid accumulator having a housing and at least one plate stack which is arranged in the housing, wherein the plate stack has a multiplicity of pole plates which are separated from one another and are completely surrounded by a fixing element, at least in a circumferential direction. According to a second aspect, the invention relates to a method for production of an accumulator.

BACKGROUND

An accumulator of this generic type is known, for example, from DE 20 2006 001 509 U1. There, a fixing element in the form of a thermoplastically welded tape is used, in order to hold the pole plates of the plate stack together. One major advantage of this arrangement is that the housing of the accumulator can be designed to have thin walls, since it need no longer exert pressure on the plate stack in order to ensure the accumulator is sufficiently resistant to shaking. In order to withstand, in particular extremely severe shaking loads without damage, the housing must, however, still have considerable strength. This leads to the consumption of a large amount of material for the production of the housing, and to the accumulator being heavy. A further disadvantage is that the plate stacks must be manufactured with high geometric accuracy. This is because, on the one hand, the plate stack must be large enough to make contact with the housing all the time, even in the event of a severe shaking load. On the other hand, the plate stack must be sufficiently small that it is not damaged during insertion into the housing. This stringent accuracy requirement for the plate stack and the housing leads to high manufacturing costs.

SUMMARY OF THE DESCRIPTION

The invention is based on the object of overcoming the disadvantages of the prior art.

The invention solves the problem by an accumulator of this generic type in which the fixing element is firmly connected to the housing. According to a second aspect, the invention solves the problem by means of a method having the following steps: (a) provision of a housing, (b) provision of a plate stack which has a multiplicity of pole plates which are separated from one another, (c) surrounding of the plate stack with a fixing element which is circumferential in a circumferential direction, (d) then, insertion of the plate stack into the housing, and (f) connection of the fixing element to the housing.

The invention has the advantage that the shaking resistance of the accumulator is increased, and the geometric requirements for the plate stack can be reduced at the same time. With the geometric requirement for the plate stack remaining unchanged, this advantageously minimizes the risk of damage occurring to the housing or the plate stack when the plate stack is being inserted into the housing.

A further advantage is that manufacturing can be carried out easily, which means that existing manufacturing facilities can easily be converted.

A further advantage is that the shaking resistance of the accumulator is increased with the wall thickness of the housing remaining unchanged. For a predetermined shaking resistance of the accumulator, the wall thickness of the housing can advantageously be reduced, which leads to less material being consumed and to a lighter-weight accumulator.

For the present description, a fixing element means, in particular, any component of the accumulator which exerts a force on the pole plates of the plate stack such that the pole plates cannot be moved away from one another. It is possible, but not necessary, for the fixing element to hold the pole plates together. It is also possible for the pole plates to be held together in some other manner, for example by means of joint connections. Examples of fixing elements are sealing straps, casings, sheaths having recesses, or meshes. By way of example, fixing elements can be connected to the plate stack by adhesive bonding or welding to the plate stack, looping and/or adhesive bonding to the plate stack.

The expression that the fixing element is firmly connected to the housing means in particular that the fixing element is attached to the housing such that accelerations and vibrations which typically occur in the case of an accumulator do not, lead to the fixing element becoming detached from the housing. It is possible for the fixing element to be joined directly to the housing, for example by welding, pressing on and/or pressing in. It is particularly advantageous for the fixing element to be adhesively bonded to the housing.

In one preferred embodiment, the fixing element is connected to a bottom of the housing. Alternatively or additively, the fixing element is also connected to an inner face of a side wall of the housing. If there are a plurality of side walls of the housing in the vicinity of the fixing element, the fixing element is preferably connected to all, these side walls. This results in particularly good resistance to shaking.

The housing preferably has T-shaped ribs which project into an internal area of the housing, and the fixing element is preferably connected to the T-shaped rib or ribs. An accumulator such as this has two advantages. On the one hand, the T-shaped ribs and the connection to the plate stack via the ribs result in particularly good resistance to shaking. On the other hand, the fixing element makes it easier to insert the plate stack in the direction of the ribs. In general, the plate stack is inserted along a longitudinal extent of the ribs. If the plate comes into contact with an edge of the rib during insertion, then it slides away from the edge on the fixing element, avoiding damage to the plate stack.

Particularly good resistance to shaking is achieved if the fixing element is also connected to a cover of the housing.

One particularly suitable option for connecting the fixing element to the housing is adhesive bonding, with an acid-resistant and/or lye-resistant adhesive joint advantageously being provided.

A fiber-reinforced plastic tape, for example composed of polypropylene, polyethylene, polyvinyl chloride or polyethylene terephthalate, has been found to be a suitable fixing element.

BRIEF DESCRIPTION OF THE DRAWINGS

One exemplary embodiment of the present invention will be explained in more detail in the following text with reference to the attached drawings, in which:

FIG. 1 shows a longitudinal section through an accumulator according to the invention, and FIG. 2 shows a second section, at right angles to the section shown in FIG. 1, through a second embodiment of an accumulator according to the invention.

DETAILED DESCRIPTION

FIG. 1 shows a cross-sectional view of an accumulator 10 which comprises electrochemical cells 12.1 to 12.6 of which the electrochemical cells 12.1, 12.2 and 12.3 are shown in FIG. 1. The electrochemical cells 12.1, 12.2, 12.3 each comprise a multiplicity of pole plates 14.1, 14.2 and 14.3, respectively, which are separated from one another and form a positive plate set, and negative pole plates 16.1, 16.2 and 16.3, respectively, which form a negative plate set. The electrochemical cells 12.1 to 12.3 are physically separated and electrically isolated from one another by partition walls 18.1, 18.2, and are arranged in a housing 19. In the following text, a reference symbol with a numerical suffix ".1", ".2", . . . denotes the respective specific object. Reference symbols without a numerical suffix denote the object in general.

The positive pole plates and the negative pole plates are each separately mechanically and electrically connected to a connector 20.1, 20.2, 20.3 and 20.4. Two respective connectors 20.1 and 20.2 as well as 20.3 and 20.4 are electrically and mechanically connected to one another through an opening, which is not shown, in the respective partition wall 18.1 or 18.2, as a result of which the electrochemical cells 12.1 to 12.3 are connected in series. Contact is made with the accumulator via a positive pole 24 and a negative pole 26 (FIG. 2).

As shown in FIG. 1, the pole plates 14, 16 are completely surrounded by two fixing elements 28.1, 282 in a circumferential direction which is indicated by an arrow U and runs at right angles to the longitudinal direction of the accumulator 10, and these two fixing elements 28.1, 28.2 hold the pole plates 14, 16 together, thus forming respective plate stacks 29.1, 29.2, 29.3. The fixing elements 28.1, 28.2 have a fixing element width B which, for example, is between 20 mm and 30 mm. It is also possible to enclose the pole plates 14, 16 in a circumferential direction which runs parallel to the longitudinal direction of the accumulator 10.

The fixing elements 28.1, 28.2 are firmly connected to a bottom 32 of the housing 19 by means of adhesive points 30.1, 30.2 on the bottom face. The fixing elements 28.1, 28.2 are furthermore connected to a side wall of the housing 19 via lateral adhesive points 34.1, 34.2.

FIG. 2 shows a horizontal cross section through a second embodiment of an accumulator according to the invention. In the embodiment shown in FIG. 2, the housing 19 has a multiplicity of T-shaped ribs 36.1, 36.2, . . . , which project into an internal area 38 of the accumulator. The T-shaped ribs 36.1, . . . have a rib width R, which is smaller by a small amount than the fixing element width B of the fixing elements.

In the embodiment shown in FIG. 2, the plate stack 29 is surrounded by three fixing elements 28.1, 28.2, 28.3. Each of the three fixing elements 28.1 to 28.3 is connected, analogously to the situation shown in FIG. 1, to the bottom of the housing 19 by means of three adhesive points, which are not shown that are at the bottom face. The fixing elements 28.1 to 28.3 are arranged on the plate stack such that they are directly opposite the T-shaped ribs 36.1 to 36.3 and are connected to them via lateral adhesive points 34.1, 34.2 and 34.3.

Furthermore, the housing 19 has a longitudinal partition wall 40 which separates the electrochemical cells 12.1 to 12.3 from the electrochemical cells 12.4 to 12.6. The fixing elements 28.1, 28.2, 28.3 are additionally fixed to the longitudinal partition wall 40 by means of lateral adhesive points 34.4, 34.5, 34.6 facing the longitudinal partition wall. Furthermore, adhesive points 42.1, 42.2 are provided on the cover face, in order to permanently connect the fixing elements to a cover, which is not shown.

The accumulator 10 is produced by first of all injection-molding the housing 19. Plate stacks 29 are furthermore formed from the positive and negative pole plates 14, 16, and are surrounded by one, two, three, four or more fixing elements 28. The fixing elements 28 are then provided with adhesive and are then inserted into the housing 19, in an insertion direction which is indicated by an arrow E. During the process, the adhesive comes into contact with the housing 19, and is cured. Battery liquid is then added, the adhesive points 42 on the cover face are applied, and a cover which is not shown is welded in a gas-tight manner to the existing housing, thus completing the production of the accumulator 10.

LIST OF REFERENCE SYMBOLS

10 Accumulator
12 Electrochemical cell
14 Positive pole plates
16 Negative pole plates
18 Partition wall
19 Housing
20 Connector
22 Connector
24 Positive pole
26 Negative pole
28 Fixing element
29 Plate stack
30 Adhesive point on the bottom face
32 Bottom
34 Lateral adhesive point
36 T-shaped rib
38 Internal area
40 Longitudinal partition wall
42 Adhesive point on the cover face
U Circumferential direction
B Fixing element width
R Rib width
E Insertion direction

The invention claimed is:

1. A prismatic lead-acid accumulator (10), having
   (a) a housing (19) and
   (b) at least one plate stack (29) which is arranged in the housing (19),
   (c) wherein the plate stack (29) has a multiplicity of pole plates (14,16) which are separated from one another, and
   (d) a fixing element (28) having a width, the width being less than a longitudinal length of at least one of the multiplicity of pole plates, the longitudinal length extending between opposing sides of the at least one of the multiplicity of pole plates,
   (e) wherein the pole plates (14, 16) are completely surrounded by the fixing element (28) at least in a circumferential direction (U), and
   (f) the fixing element (28) is firmly connected to the housing (19),
   characterized in that the housing has a plurality of T-shaped ribs (36) which project into an internal area (38) of the housing (19), and that the fixing element (28) is connected to an inner face of a side wall of the housing (19) and that the fixing element is connected to the T-shaped rib (36), and wherein the fixing element (28) is a fiber-reinforced plastic tape.

2. The accumulator (10) as claimed in claim 1, characterized in that the fixing element (28) is connected to a bottom (32) of the housing (19).

3. The accumulator (10) as claimed in claim 1, characterized in that the fixing element (28) is connected to a cover of the housing (19).

4. The accumulator (10) as claimed in claim 1, characterized in that the fixing element (28) is adhesively bonded to the housing (19).

5. The accumulator (10) as claimed in claim 1, characterized in that the fixing element (28) is a welded, plastic tape.

6. The accumulator (10) as claimed in claim 1, wherein the plate stack (29) is formed by the fixing element (28) holding together the multiplicity of pole plates (14, 16).

7. The accumulator (10) as claimed in claim 1, wherein the fixing element (28) is coupled to the multiplicity of pole plates (14, 16).

8. The accumulator (10) as claimed in claim 7, wherein the circumferential direction (U) is provided at a right angle to the longitudinal direction of the accumulator (10).

9. The accumulator (10) as claimed in claim 1, wherein the circumferential direction (U) extends from a bottom (32) toward a cover of the housing (19).

10. The accumulator (10) as claimed in claim 1, wherein the circumferential direction (U) is provided parallel to opposing sidewalls of the housing and perpendicular to a bottom of the housing.

11. The accumulator (10) as claimed in claim 1, wherein the fixing element (28) contacts top and bottom longitudinal edges of each of the multiplicity of pole plates (14,16) of plate stack (29).

12. The accumulator (10) as claimed in claim 1, wherein the housing (19) includes a plurality of walls, the plurality of walls includes a plurality of housing side walls, a housing bottom, and a housing top, the fixing element (28) circumferentially surrounds the multiplicity of pole plates (14,16) of plate stack (29), however is in contact with no more than three of the plurality of walls.

13. A method for production of a prismatic lead-acid accumulator (10) having the following steps:
   (a) providing a housing (19),
   (b) providing a plate stack (29) which has a multiplicity of pole plates (14, 16) which are separated from one another,
   (c) completely surrounding the plate stack (29) with a fixing element (28) which is circumferential in a circumferential direction (U),
   (d) then, inserting the plate stack (29) into the housing (19), and
   (e) connecting the fixing element (28) to the housing (19)
   characterized in that the housing has a plurality of T-shaped ribs (36) which project into an internal area (38) of the housing (19), and that the fixing element (28) is arranged such that it slides along the rib (36) when the plate stack is inserted into the housing (19) and wherein the fixing element (28) is made of a fiber-reinforced plastic tape.

14. The method as claimed in claim 13, characterized in that the connection is adhesive bonding.

15. A prismatic lead-acid accumulator (10), having
   (a) a housing (19), wherein the housing has a plurality of T-shaped ribs (36) which project into an internal area (38) of the housing (19), and
   (b) at least one plate stack (29) which is arranged in the housing (19),
   (c) wherein the plate stack (29) has a multiplicity of pole plates (14, 16) which are separated from one another, and
   (d) a unitary fixing element (28) coupled to the plate stack,
   (e) wherein the pole plates (14, 16) are enclosed by the fixing element (28) at least in a circumferential direction (U),
   characterized in that
   (f) the fixing element (28) is firmly connected to the housing (19), that the fixing element (28) is connected to an inner face of a side wall of the housing (19) and that the fixing element is connected to the T-shaped rib (36), and that the fixing element (28) is a fiber-reinforced plastic tape.

\* \* \* \* \*

UNITED STATES PATENT AND TRADEMARK OFFICE
CERTIFICATE OF CORRECTION

PATENT NO. : 9,257,722 B2  
APPLICATION NO. : 12/596277  
DATED : February 9, 2016  
INVENTOR(S) : Oliver Bosch Page 1 of 1

It is certified that error appears in the above-identified patent and that said Letters Patent is hereby corrected as shown below:

On the Title Page, in Item (57), under "ABSTRACT", in Column 2, Line 4, delete "suspended" and insert -- surrounded --, therefor.

In The Specification

In Column 2, Line 17, delete "not," and insert -- not --, therefor.

In Column 2, Line 28, delete "all," and insert -- all --, therefor.

In Column 3, Line 23, delete "282" and insert -- 28.2 --, therefor.

Signed and Sealed this  
Fourteenth Day of June, 2016

Michelle K. Lee  
*Director of the United States Patent and Trademark Office*